United States Patent
Moon et al.

(10) Patent No.: US 11,193,529 B2
(45) Date of Patent: Dec. 7, 2021

(54) THRUST BEARING FOR TURBO COMPRESSOR

(71) Applicant: LG Electronics Inc., Seoul (KR)

(72) Inventors: Changgook Moon, Seoul (KR); Jun Chul Oh, Seoul (KR); Seheon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/812,806

(22) Filed: Mar. 9, 2020

(65) Prior Publication Data

US 2020/0291987 A1    Sep. 17, 2020

(30) Foreign Application Priority Data

Mar. 15, 2019 (KR) .......................... 10-2019-0030131

(51) Int. Cl.
*F16C 17/04* (2006.01)
*F04D 29/051* (2006.01)

(52) U.S. Cl.
CPC ........ *F16C 17/042* (2013.01); *F04D 29/0513* (2013.01); *F05D 2220/40* (2013.01); *F16C 2360/24* (2013.01)

(58) Field of Classification Search
CPC .... F16C 17/042; F16C 2360/24; F04D 17/10; F04D 29/0513; F05D 2220/40
See application file for complete search history.

(56) References Cited

U.S. PATENT DOCUMENTS

| | | | |
|---|---|---|---|
| 5,110,220 A * | 5/1992 | Gu | F16C 27/08 384/105 |
| 5,833,369 A * | 11/1998 | Heshmat | F16C 27/02 384/105 |
| 2008/0185928 A1 | 8/2008 | Buhler et al. | |
| 2016/0195128 A1 * | 7/2016 | Omori | F16C 17/042 384/105 |
| 2016/0195129 A1 * | 7/2016 | Omori | F16C 17/042 384/105 |
| 2018/0156266 A1 * | 6/2018 | Lee | F16C 17/042 |
| 2018/0291950 A1 * | 10/2018 | Park | F04D 17/10 |

FOREIGN PATENT DOCUMENTS

| | | |
|---|---|---|
| CN | 105889096 | 8/2016 |
| JP | 2015059629 | 3/2015 |
| KR | 1020060015094 | 2/2006 |
| KR | 1020150102120 | 9/2015 |
| KR | 1020170061479 | 6/2017 |

OTHER PUBLICATIONS

Extended European Search Report in European Appln. No. 20163063.9, dated Jul. 30, 2020, 6 pages.
Korean Office Action in Korean Appln. No. 10-2019-0030131, dated May 13, 2020, 16 pages (with English translation).

* cited by examiner

*Primary Examiner* — Alan B Waits
(74) *Attorney, Agent, or Firm* — Fish & Richardson P.C.

(57) ABSTRACT

Disclosed herein is a thrust bearing for a turbo compressor, the thrust bearing has a structure that is modified in response to a portion where a deformation amount of a thrust runner is relatively large on the basis of magnitude of a force applied at the time of rotation of a shaft of a turbo compressor, to maintain a thickness of an oil film constantly and to increase a load supporting force of the thrust bearing, thereby ensuring improved durability of the thrust bearing.

19 Claims, 12 Drawing Sheets

[FIG. 1]
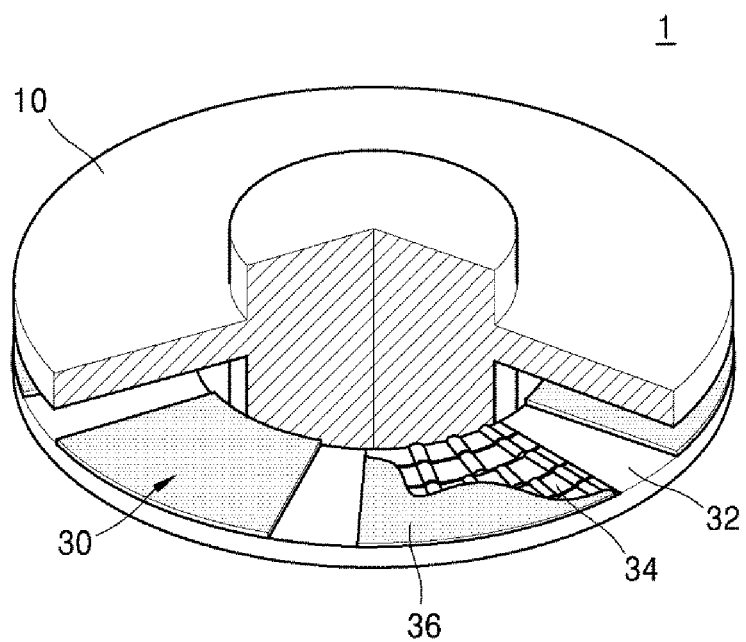

[FIG. 2]
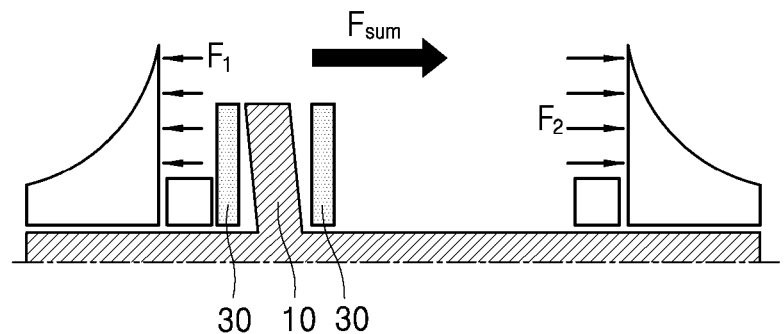
[FIG. 3]
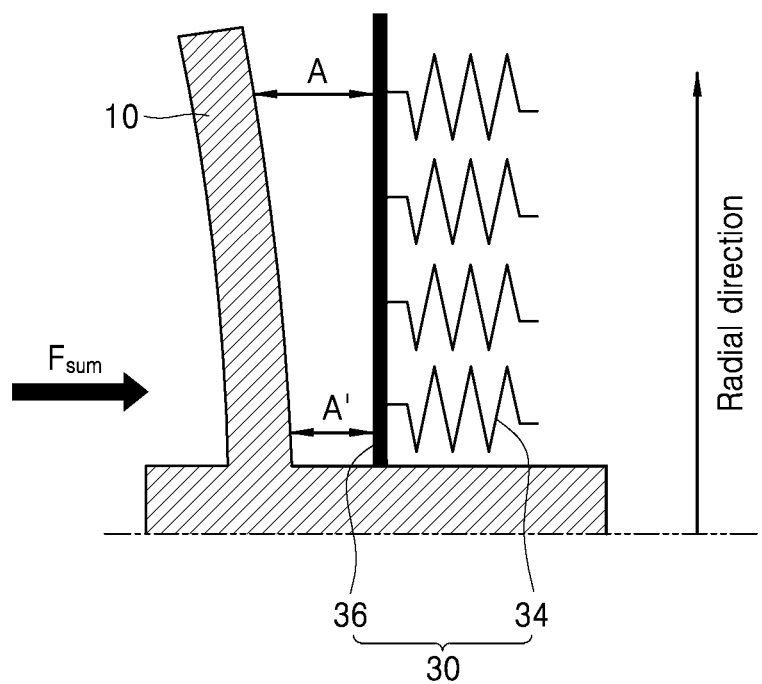

【FIG. 4】
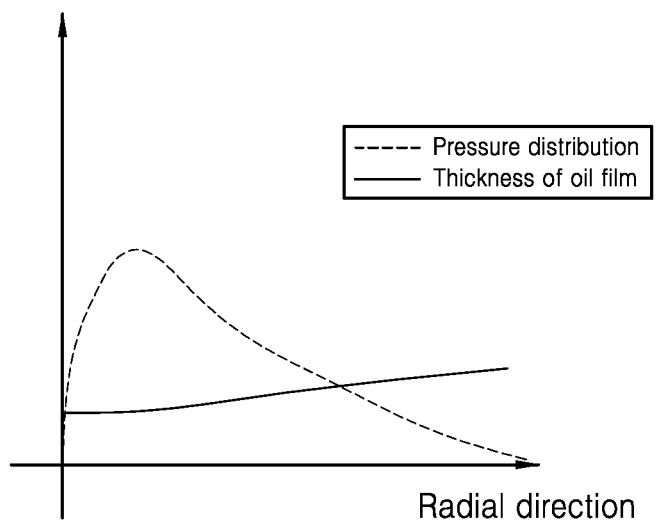
【FIG. 5】
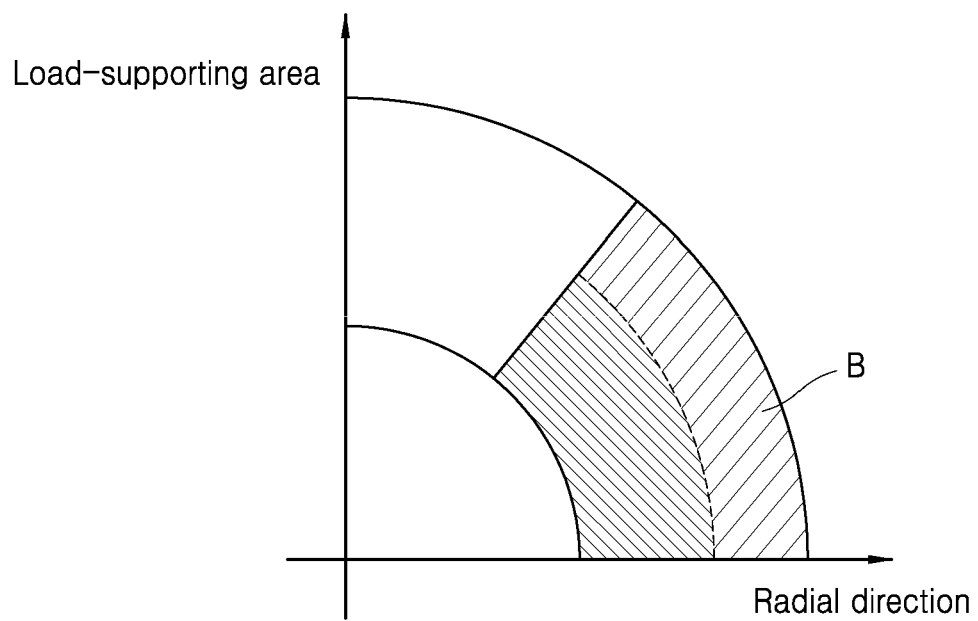

[FIG. 6]
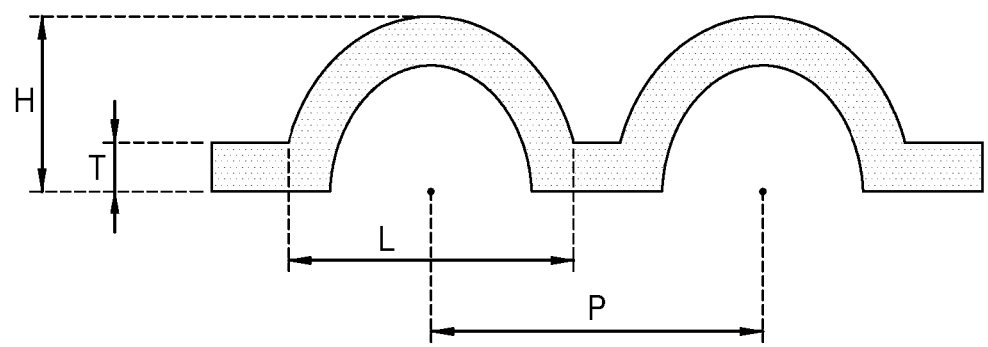

[FIG. 7]
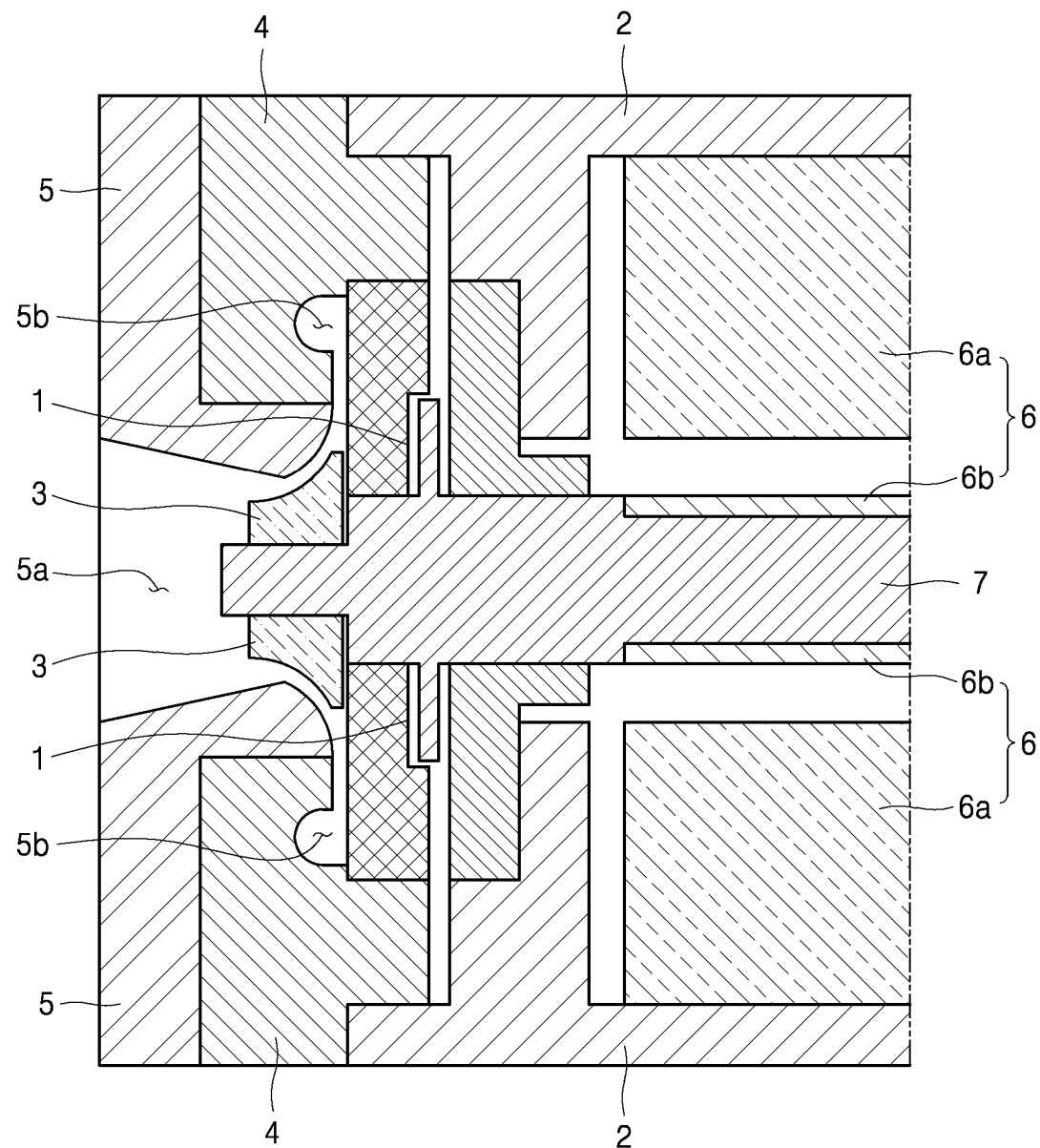

[FIG. 8]
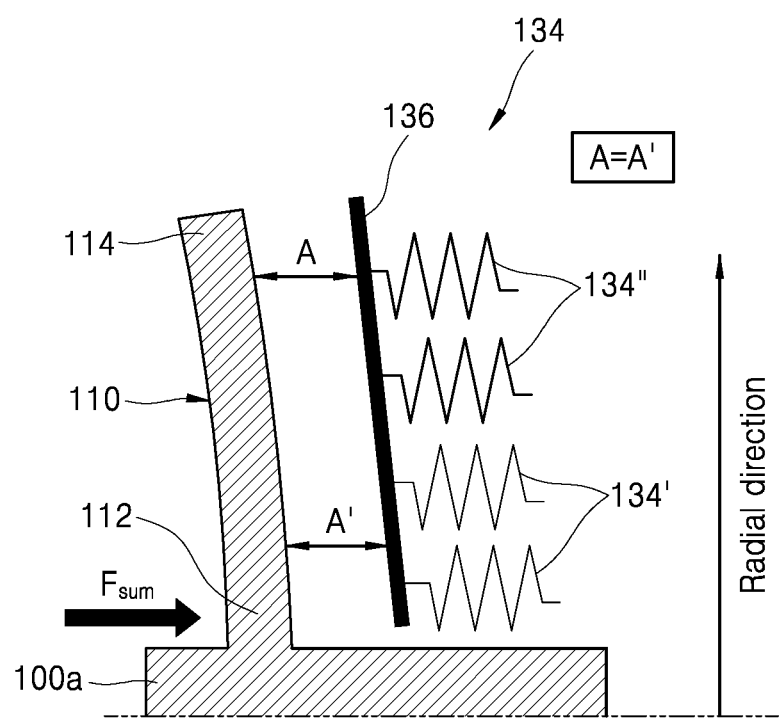
[FIG. 9]
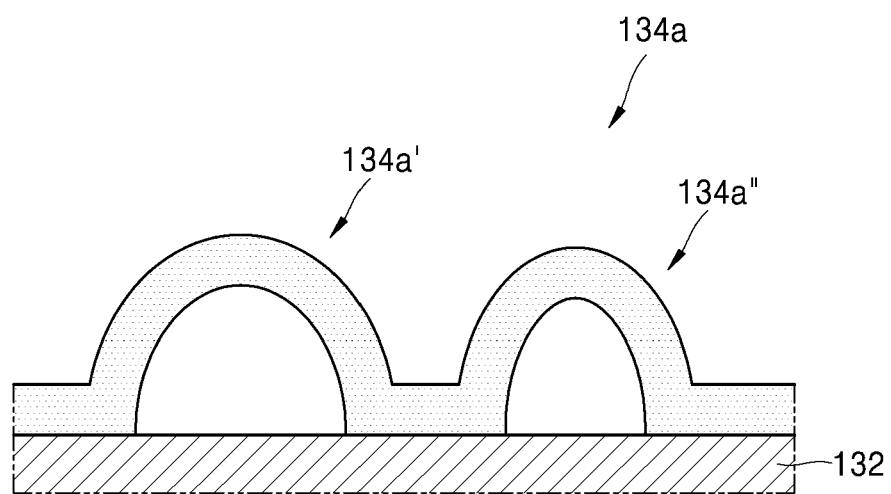

[FIG. 10]
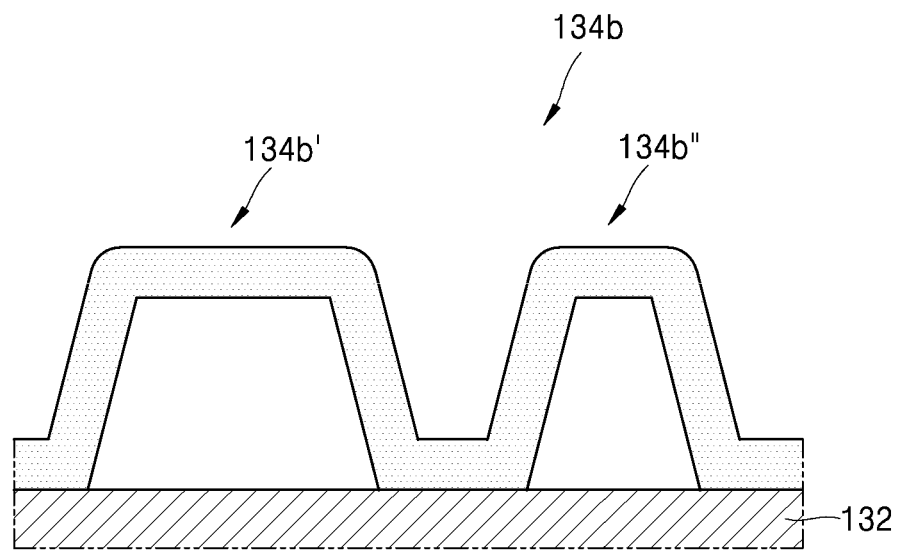
[FIG. 11]
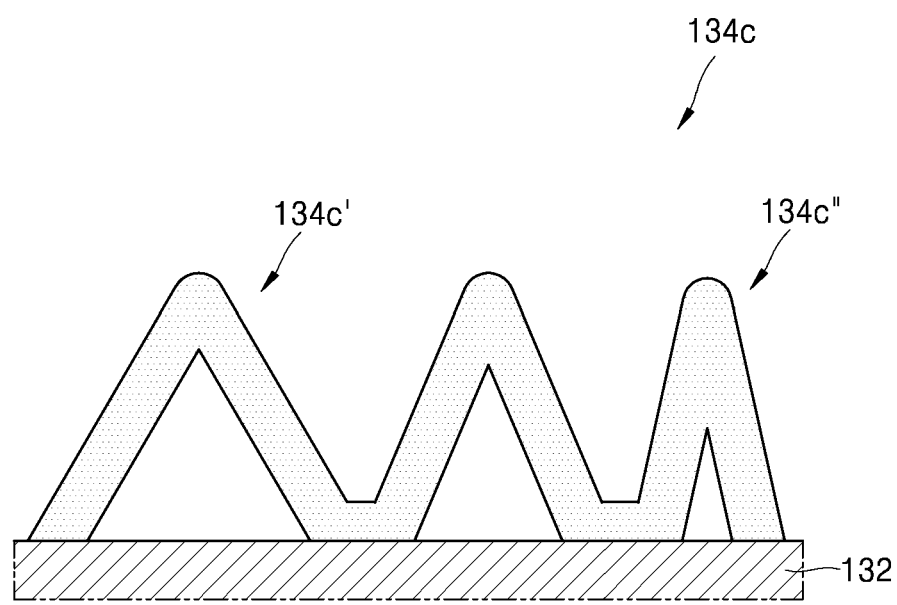

【FIG. 12】
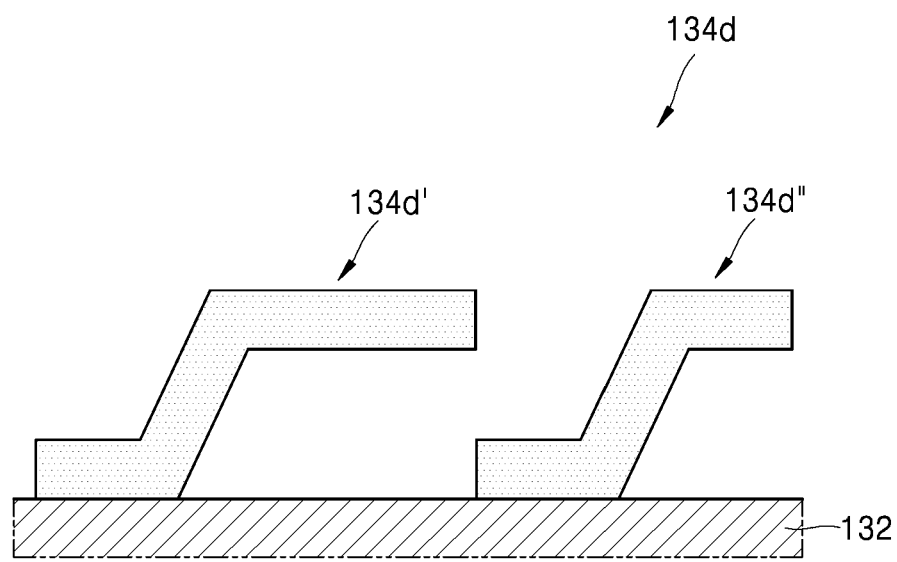
【FIG. 13】
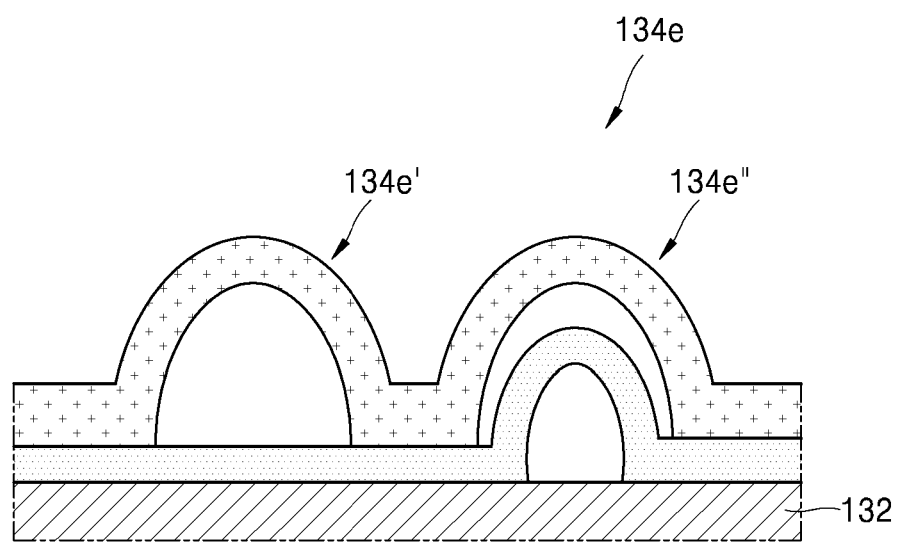

[FIG. 14]
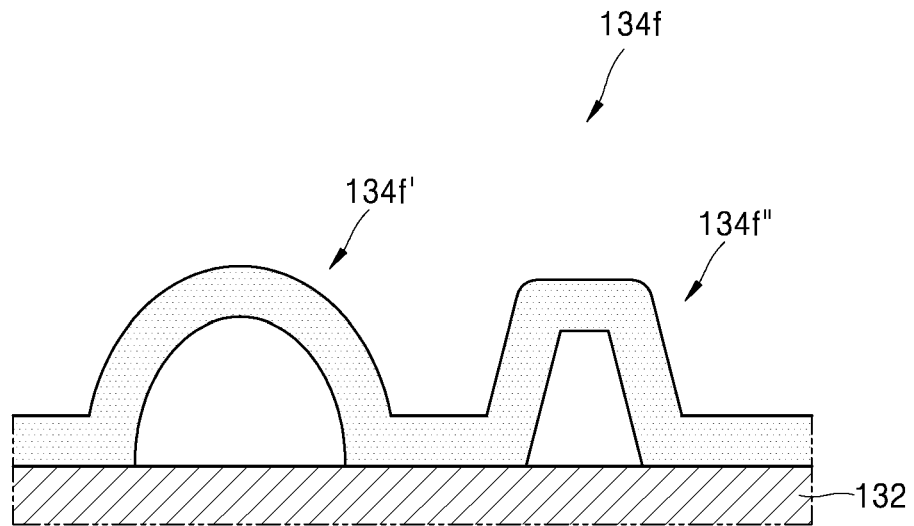
[FIG. 15]
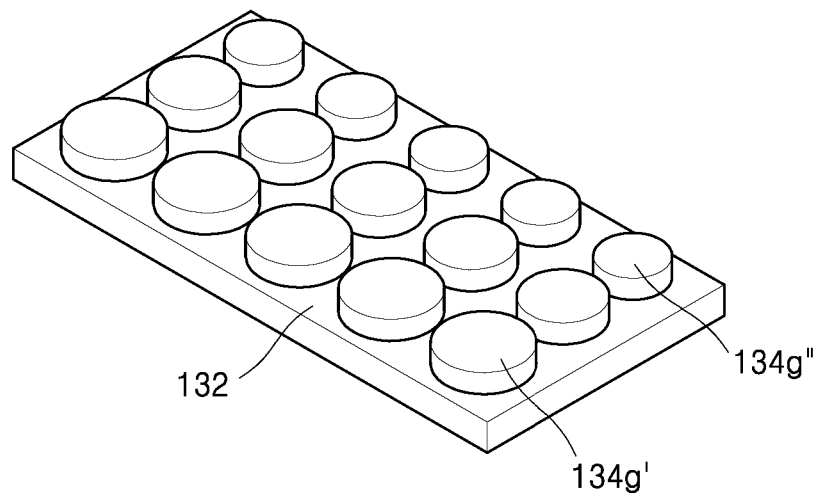

[FIG. 16]
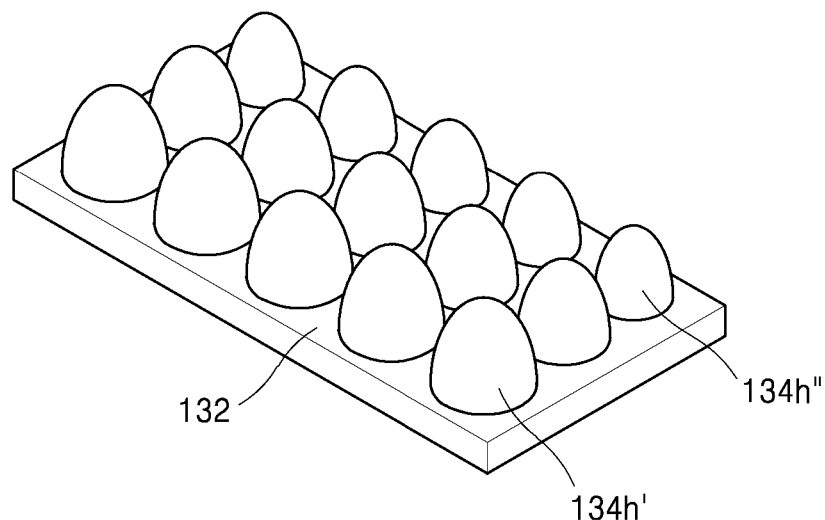
[FIG. 17]
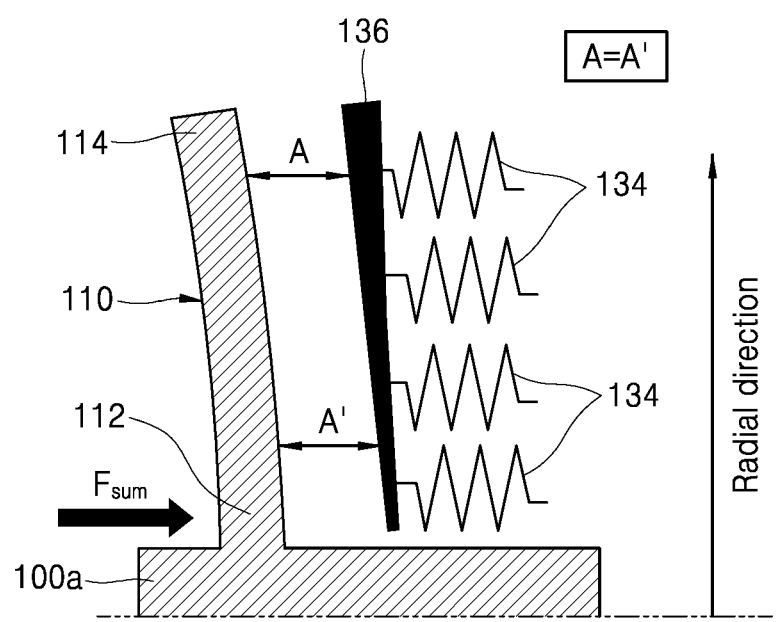

【FIG. 18】
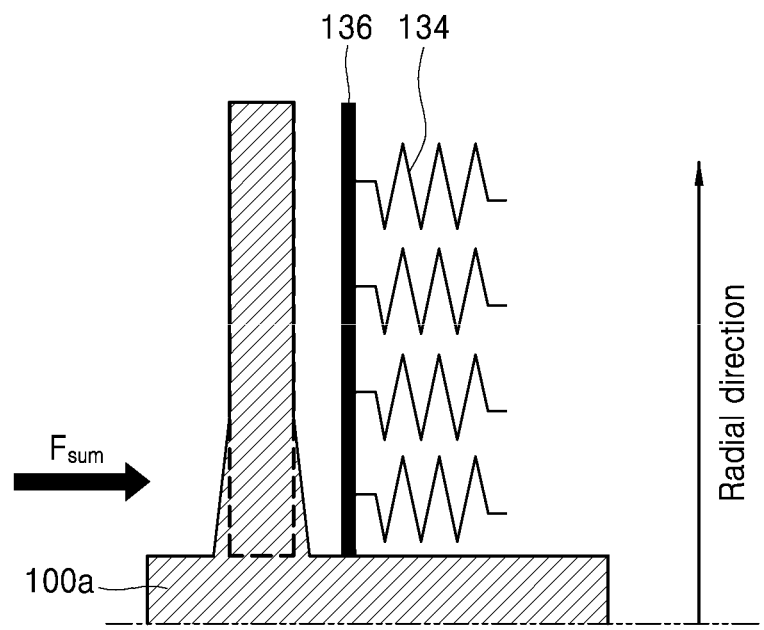
【FIG. 19】
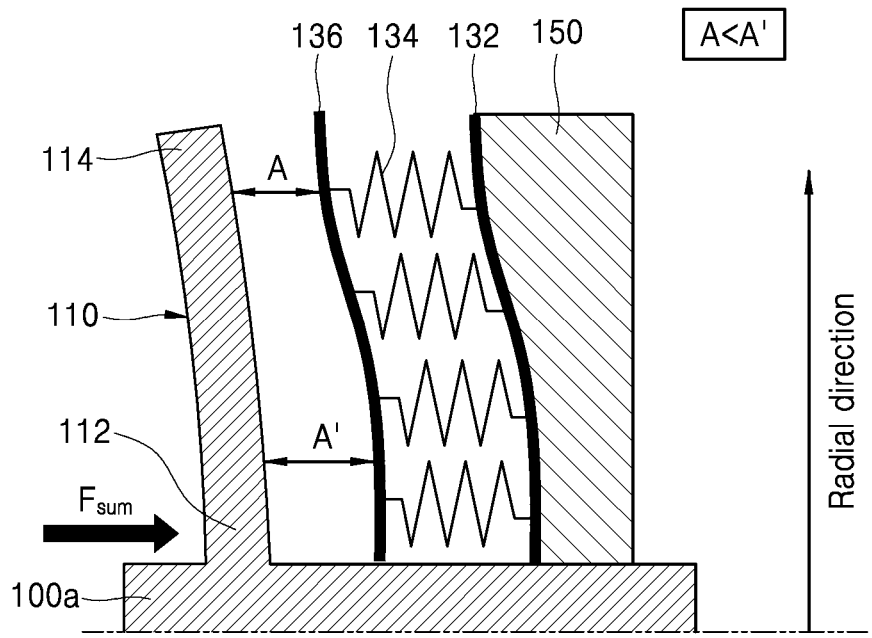

【FIG. 20】
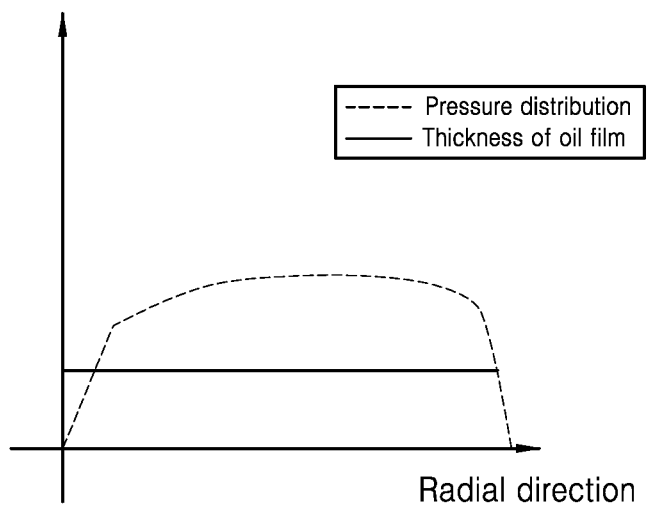
【FIG. 21】
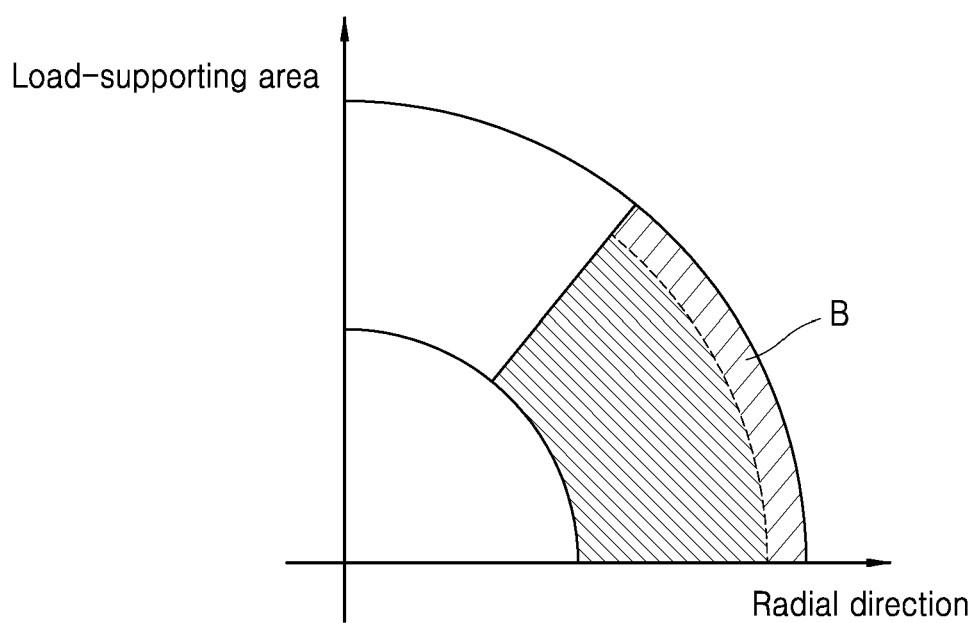

THRUST BEARING FOR TURBO COMPRESSOR

CROSS-REFERENCE TO RELATED APPLICATION

This application claims priority to and the benefit of Korean Patent Application No. 10-2019-0030131, filed in Korea on Mar. 15, 2019, the disclosure of which is incorporated herein by reference in its entirety.

BACKGROUND

1. Field

The present disclosure relates to a thrust bearing for a turbo compressor.

2. Background

Bearings are a mechanical component that rotatably supports a shaft, and include a ball bearing, a journal bearing, an air or gas foil bearing and the like that are generally used. The ball bearing or the journal bearing supports a shaft using an oil film. The foil bearing supports a shaft by forming a high-pressure air layer between a top foil and the shaft. In the foil bearing, the high-pressure air layer performs a function similar to that of an oil film. Accordingly, the high-pressure air layer is usually referred to as an "oil film".

The air oil bearing is also referred to as a thrust bearing and is used for an air compressor and the like. Below, a structure of a thrust bearing applied to an ordinary air compressor is described with reference to the drawings.

FIG. 1 is a perspective view illustrating a basic structure of an ordinary thrust bearing. FIGS. 2 and 3 are mimetic views illustrating an example of modification of the thrust bearing in FIG. 1 under conditions of high-speed rotation. FIG. 4 is a graph illustrating a thickness of an oil film and pressure distribution of the thrust bearing in FIG. 1. FIG. 5 is a graph illustrating a reduced load-supporting surface area caused by deformation of the thrust bearings in FIGS. 2 and 3.

As illustrated in FIG. 1, an ordinary thrust bearing 1 is comprised of a thrust runner 10 having a circular plate shape, and a bump foil assembly 30 spaced a predetermined distance apart from the thrust runner 10 and coupled to the thrust runner 10, and a shaft of an air compressor passes through centers of the thrust runner 10 and the bump foil assembly 30.

The bump foil assembly 30 is comprised of a bearing plate 32 which has a circular plate shape and through which the shaft passes, a plurality of bump foils 34 mounted onto the bearing plate 32, and a top foil 36 placed between the bump foil 34 and the thrust runner 10 and covering the bump foil 34.

A load supporting force of the thrust bearing 1 is generated when an oil film having a predetermined thickness is formed between surfaces of the thrust runner 10 and the top foil 36. An ordinary air compressor operates under conditions of low pressure. Accordingly, a sufficient load supporting force may be ensured through the thrust bearing 1 even in case the above-described thrust bearing 1 of the related art is applied to the air compressor.

However, in case the thrust bearing 1 of the related art is applied to a device such as a turbo compressor that operates under conditions of high pressure and high speed, a thickness of an oil film may not be constantly maintained, due to deformation of the thrust runner.

When a direction of a force applied in a radial direction and a circumferential direction is analyzed in case a high-speed rotary shaft rotates, magnitude of a force at a portion where the thrust bearing is not installed is greater than magnitude of a force at a portion where the thrust bearing is installed, as illustrated in FIG. 2.

Accordingly, as illustrated in FIG. 3, since a direction of the sum of forces is applied towards the portion where the thrust bearing is not installed, a free end of the thrust runner 11 is deformed in a direction opposite to the direction of the sum of forces. Thus, a thickness (A') of an oil film at an inner side of the thrust runner 11 is smaller than a thickness (A) of an oil film at the free end of the thrust runner 11.

In the above-described structure, a thickness (A') of the oil film at the inner side of the thrust runner 11, which has a relatively high pressure, is relatively small, as illustrated in FIGS. 3 and 4. Accordingly, a load-supporting surface area has no option but to decrease.

As a result, as in FIGS. 3 and 5, the load-supporting surface area of the thrust runner 11 is significantly reduced compared to the load-supporting surface area of the thrust runner 11 prior to deformation of the thrust runner 11 due to the deformation of the thrust runner 11 (a reduced area B).

In this context, the thrust bearing of the related art may not be applied to a turbo compressor that operates under conditions of high speed and high pressure. In case a thrust bearing structure of the related art is applied to a turbo compressor, a load supporting force required for driving of the turbo compressor may not be sufficiently generated. Accordingly, a shaft, a bearing and an impeller and the like may be deteriorated or damaged by heat.

SUMMARY

The present disclosure is directed to a thrust bearing for a turbo compressor that may supply a sufficient load supporting force even under conditions of high speed and high pressure.

The present disclosure is also directed to a thrust bearing for a turbo compressor having an improved shape considering a shape of a thrust runner that is deformed under high pressure.

Aspects of the present disclosure are not limited to the above-described ones. Additionally, other aspects and advantages that have not been mentioned can be clearly understood from the following description and can be more clearly understood from embodiments. Further, it will be understood that the aspects and advantages of the present disclosure can be realized via means and combinations thereof that are described in the appended claims.

Particular implementations described herein include a thrust bearing. The thrust bearing can include a thrust runner, a bearing plate, and a bump foil assembly. The thrust runner may have a circular plate shape. The thrust runner may be configured to be coupled to a shaft of a turbo compressor and rotatably support an impeller. The bearing plate may be disposed at a surface of the thrust runner. The bump foil assembly may be disposed on the bearing plate and include (i) a plurality of bump foils mounted to the bearing plate and (ii) a top foil placed between the plurality of bump foils and the thrust runner and configured to cover the plurality of bump foils. The thrust runner may be configured to at least partially deform as the shaft rotates. At least one of the bearing plate, the bump foil, or the top foil may be configured to at least partially deform based on the thrust runner deforming.

In some implementations, the thrust bearing can optionally include one or more of the following features. The thrust runner may be configured to, based on the shaft rotating, deform to be spaced apart from the bump foil assembly with increasing distances in a direction away from the shaft.

The bump foil assembly may include a first rigidity foil and a second rigidity foil having rigidity higher than the first rigidity foil. The thrust runner may include a first runner portion and a second runner portion configured to deform more than the first runner portion as the shaft rotates. The first rigidity foil may be placed closer to the first runner portion than the second runner portion. The second rigidity foil may be placed closer to the second runner portion than the first runner portion. The bump foil assembly may include a leading edge and a trailing edge. The training edge may be located at one end of the bump foil and coupled to the bearing plate. The leading edge may be located at the other end of the bump foil and is a free end. A direction from the trailing edge toward the leading edge may correspond to a direction of rotation of the thrust bearing. A first bump length of the first rigidity foil may be longer than a second bump length of the second rigidity foil. The first bump length may be a distance between starting and ending portions of a bump crest of the first rigidity foil, and the second bump length may be a distance between starting and ending portions of a bump crest of the second rigidity foil. The first rigidity foil and the second rigidity foil may be configured as a single bump foil. One end of the top foil may be coupled to the bearing plate, and the other end of the top foil may be a free end.

The bump foil assembly may include a plurality of first rigidity foils and a plurality of second rigidity foils. Each second rigidity foil may have rigidity higher than each first rigidity foil. The thrust runner may include a first runner portion and a second runner portion configured to deform more than the first runner portion as the shaft rotates. The plurality of first rigidity foils may be placed closer to the first runner portion than the second runner portion. The plurality of second rigidity foils may be placed closer to the second runner portion than the first runner portion. The plurality of first rigidity foils may be continuously placed. The plurality of second rigidity foils may be continuously placed. The plurality of first rigidity foils and the plurality of second rigidity foils may be separate on the bearing plate.

The top foil may have a thickness that gradually increases in a direction from a first portion of the thrust runner towards a second portion of the thrust runner. The first portion may be configured to deform less than the second portion as the shaft rotates.

The thrust runner may have a thickness that increases in a direction from an outer circumference of the thrust runner towards the shaft.

The bearing housing may have a thickness that gradually increases in a direction from a first portion of the thrust runner towards a second portion of the thrust runner. The first portion may be configured to deform less than the second portion as the shaft rotates. Each of the bearing plate and the top foil may have a shape corresponding to a shape of the bearing housing. The bearing plate may be spaced apart from the top foil at a constant distance in a radial direction of the thrust runner.

Particular implementations described herein include a turbo compressor. The turbo compressor may include a shaft, an impeller, and a thrust bearing. The thrust bearing may include a thrust runner, a bearing plate, and a bump foil assembly. The thrust runner may have a circular plate shape. The thrust runner may be configured to be coupled to the shaft and rotatably support the impeller. The bearing plate may be disposed at a surface of the thrust runner. The bump foil assembly may be disposed on the bearing plate and including (i) a plurality of bump foils mounted to the bearing plate and (ii) a top foil placed between the plurality of bump foils and the thrust runner and configured to cover the plurality of bump foils. The thrust runner may be configured to at least partially deform as the shaft rotates. At least one of the bearing plate, the bump foil, or the top foil may be configured to at least partially deform based on the thrust runner deforming.

In some implementations, the turbo compressor can optionally include one or more of the following features. The thrust runner may be configured to, based on the shaft rotating, deform to be spaced apart from the bump foil assembly with increasing distances in a direction away from the shaft.

The bump foil assembly may include a first rigidity foil and a second rigidity foil having rigidity higher than the first rigidity foil. The thrust runner may include a first runner portion and a second runner portion configured to deform more than the first runner portion as the shaft rotates. The first rigidity foil may be placed closer to the first runner portion than the second runner portion. The second rigidity foil may be placed closer to the second runner portion than the first runner portion. The bump foil assembly may include a leading edge and a trailing edge. The training edge may be located at one end of the bump foil and coupled to the bearing plate. The leading edge may be located at the other end of the bump foil and is a free end. A direction from the trailing edge toward the leading edge may correspond to a direction of rotation of the thrust bearing. A first bump length of the first rigidity foil may be longer than a second bump length of the second rigidity foil. The first bump length may be a distance between starting and ending portions of a bump crest of the first rigidity foil, and the second bump length may be a distance between starting and ending portions of a bump crest of the second rigidity foil. The first rigidity foil and the second rigidity foil may be configured as a single bump foil. One end of the top foil may be coupled to the bearing plate, and the other end of the top foil may be a free end.

The bump foil assembly may include a plurality of first rigidity foils and a plurality of second rigidity foils. Each second rigidity foil may have rigidity higher than each first rigidity foil. The thrust runner may include a first runner portion and a second runner portion configured to deform more than the first runner portion as the shaft rotates. The plurality of first rigidity foils may be placed closer to the first runner portion than the second runner portion. The plurality of second rigidity foils may be placed closer to the second runner portion than the first runner portion. The plurality of first rigidity foils may be continuously placed. The plurality of second rigidity foils may be continuously placed. The plurality of first rigidity foils and the plurality of second rigidity foils may be separate on the bearing plate.

A thrust bearing according to an embodiment may include a thrust runner which has a circular plate shape and through which a shaft of a turbo compressor passes; and a bump foil assembly including a bearing plate that is placed at both sides of a plate surface of the thrust runner, a plurality of bump foils that is mounted onto the bearing plate, and a top foil that is placed between the bump foil and the thrust runner and that covers the bump foil.

The shape of the thrust runner may be deformed by a force that is applied to the thrust runner when the shaft rotates, and at least one of the bearing plate, the bump foil and the top foil may include a structure that follows a change in shapes of the thrust runner.

A low rigidity foil having rigidity lower than a high rigidity foil may be placed at a portion where a deformation amount of the thrust runner that is deformed when the shaft rotates is relatively large, and a high rigidity foil having rigidity higher than a low rigidity foil may be placed at a portion where the deformation amount of the thrust runner is relatively small.

The above-described structure is to evenly deform a bump foil considering distributed load based on a force applied to the thrust bearing. That is, the structure is a result of consideration of a load supporting force that varies depending on rigidity of the bump foil. As described above, a bump foil having different rigidity is placed in response to a deformation amount and a deformed portion of the thrust runner. Accordingly, a thickness of an oil film at a central portion and a distal end of the thrust runner may be maintained evenly.

According to another embodiment, provided is a structure in which a shape of the top foil is modified instead of modifying rigidity of the bump foil. In this case, the top foil may have a shape in which a thickness is gradually increased from a portion where a deformation amount of the thrust runner that is deformed when the shaft rotates is relatively small towards a portion where the deformation amount of the thrust runner is relatively large.

Accordingly, a difference between a portion where a thickness of an oil film is increased by deformation of the thrust runner and a portion where a thickness of an oil film is decreased by deformation of the thrust runner may be maintained. Additionally, a surface area in which the thickness of the oil film is constantly maintained is significantly increased compared to that of a structure of the related art. Thus, a load supporting force of the thrust bearing may be effectively increased.

According to another embodiment, the thrust runner has a shape in which a thickness is increased from an outer side of the thrust runner in a radial direction thereof towards a portion adjacent to the shaft. Accordingly, rigidity of the thrust runner may be increased and a deformation amount of the thrust runner itself may be reduced.

According to another embodiment, a bearing housing that supports the thrust bearing has a shape in which a thickness is increased towards an outer circumference of the bearing housing.

Accordingly, a thickness of an oil film may be constantly maintained, and a surface area in which the thickness of the oil film is constantly maintained is significantly increased compared to that of a structure of the related art. Thus, a load supporting force of the thrust bearing may be effectively increased.

According to one aspect of the present disclosure, a thrust bearing, comprises: a thrust runner which has a circular plate shape, which is coupled to a shaft of a turbo compressor, which rotatably supports an impeller and through which the shaft passes; and a bump foil assembly provided with a bearing plate placed respectively at both sides of a plate surface of the thrust runner, a plurality of bump foils mounted onto the bearing plate, and a top foil placed between the bump foil and the thrust runner and configured to cover the bump foil, wherein the thrust runner has a shape that is deformed by a force applied to the thrust runner when the shaft rotates, and wherein at least one of the bearing plate, the bump foil and the top foil may include a structure that follows a change in shapes of the thrust runner.

Preferably, the thrust runner is deformed into a shape in which the thrust runner becomes farther away from the foil assembly as the thrust runner becomes farther away from the shaft while being deformed by a force applied to the thrust runner when the shaft rotates.

Preferably, the bump foil includes a low rigidity foil and a high rigidity foil, the low rigidity foil having rigidity lower than the high rigidity foil is placed at a portion where a deformation amount of the thrust runner that is deformed when the shaft rotates is relatively large, and the high rigidity foil having rigidity higher than the low rigidity foil is placed at a portion where the deformation amount of the thrust runner is relatively small.

Preferably, the bump foil assembly includes a leading edge and a trailing edge, the training edge is placed at one end of the bump foil coupled to the bearing plate while the leading edge is placed at the other end of the bump foil formed as a free end, and a direction facing from the trailing edge to the leading edge corresponds to a direction of rotation of the thrust bearing.

Preferably, a bump length of the low rigidity foil is longer than a bump length of the high rigidity foil.

Preferably, the low rigidity foil and the high rigidity foil are formed onto a single bump foil.

Preferably, as for the bump foil assembly, one end of the top foil is coupled to the bearing plate, and the other end of the top foil is formed as a free end.

Preferably, a plurality of the low rigidity foils are continuously placed, a plurality of the high rigidity foils are continuously placed, and each of the low rigidity foils and the high rigidity foils is placed independently on the bearing plate.

Preferably, the top foil has a shape in which a thickness gradually increases from a portion where a deformation amount of the thrust runner that is deformed when the shaft rotates is relatively small towards a portion where the deformation amount of the thrust runner is relatively large.

Preferably, the thrust runner has a shape in which a thickness increases from an outer circumference of the thrust runner towards a portion adjacent to the shaft.

Preferably, the bearing housing has a shape in which a thickness gradually increases from a portion where a deformation amount of the thrust runner that is deformed when the shaft rotates is relatively small towards a portion where the deformation amount of the thrust runner is relatively large.

Preferably, as for the bump foil assembly, the bearing plate and the top foil have a shape corresponding to that of the bearing housing, and a distance between the bearing plate and the top foil are identical in a radial direction of the thrust runner.

According to another aspect of the present disclosure, a turbo compressor may include a thrust bearing, wherein the thrust bearing may include a thrust runner and bump foil assembly, the bump foil assembly may include a bearing plate, a bump foil and a top foil, the thrust runner may have a shape that is deformed by a force applied to the thrust runner at the time of rotation of a shaft, and at least one of the bearing plate, the bump foil and the top foil may include a structure that follows a change in shapes of the thrust runner.

The present disclosure may evenly maintaining a thickness of an oil film between the thrust runner and the top foil, thereby enabling the thrust bearing to supply a sufficient load supporting force required under conditions of high speed and high pressure.

The present disclosure may supply a thrust bearing that includes the bump foil and the thrust runner having an improved shape considering the thrust runner having a shape deformed under high pressure, thereby enabling the thrust bearing to supply a sufficient load supporting force required under conditions of high speed and high pressure.

Detailed effects of the present disclosure are described together with the above-described effects in the detailed description of the disclosure.

BRIEF DESCRIPTION OF THE DRAWINGS

Embodiments are described in detail with reference to the following drawings, wherein:

FIG. 1 is a perspective view illustrating a basic structure of an ordinary thrust bearing;

FIGS. 2 and 3 are mimetic views illustrating an example of modification of the thrust bearing in FIG. 1 under conditions of high-speed rotation;

FIG. 4 is a graph illustrating a thickness of an oil film and pressure distribution of the thrust bearing in FIG. 1;

FIG. 5 is a graph illustrating a reduced load-supporting surface area caused by deformation of the thrust bearings in FIGS. 2 and 3;

FIG. 6 is a mimetic view illustrating a structure of a bump foil of an ordinary thrust bearing;

FIG. 7 is a cross-sectional view schematically illustrating a structure of a first exemplary turbo compressor;

FIG. 8 is a mimetic view illustrating a structure of a first exemplary thrust bearing;

FIGS. 9 to 16 are mimetic views illustrating examples of modification of a structure of the bump foil in FIG. 6;

FIG. 17 is a mimetic view illustrating a structure of a second exemplary thrust bearing;

FIG. 18 is a mimetic view illustrating a structure of a third exemplary thrust bearing;

FIG. 19 is a mimetic view illustrating a structure of a fourth exemplary thrust bearing;

FIG. 20 is a graph illustrating a thickness of an oil film and pressure distribution of exemplary thrust bearings; and FIG. 21 is a graph illustrating an increased load-supporting surface area of exemplary thrust bearings.

DETAILED DESCRIPTION

The above-described aspects, features and advantages are specifically described with reference to the accompanying drawings hereunder such that one having ordinary skill in the art to which the present disclosure pertains may easily implement the technical spirit of the disclosure. In describing the disclosure, detailed description of known technologies in relation to the disclosure is omitted if it is deemed to make the gist of the present disclosure unnecessarily vague. Below, preferred embodiments of the present disclosure are specifically described with reference to the accompanying drawings. Throughout the drawings, identical reference numerals denote identical or similar components.

When any component is described as being "at an upper portion (or a lower portion)" of a component, or "on (or under)" a component, any component may be placed on the upper surface (or the lower surface) of the component, and an additional component may be interposed between the component and any component placed on (or under) the component.

When a component is described as being "connected" to another component, it should be understood that the components may be directly "connected" or an additional component may be "interposed" between the two components, or the two components may be "connected" through an additional component.

In the present disclosure, the term "oil film" does not denote an ordinary oil film and is used to indicate a type of air layer in which air as fluid having a property similar to viscosity of an oil film is suctioned and creates pressure. Accordingly, a "thickness of an oil film" denotes a thickness of an air layer that creates pressure, or a width (or a thickness) of a space in which an air layer may be formed, not a thickness of a film having a certain shape.

In the drawings, the bump foil has a specific shape that includes a bump crest and a bump trough. However, in some of the drawings, the above-described shape of the bump foil is not specifically illustrated for convenience. Instead, a direction in which the bump foil is deformed is only illustrated.

FIG. 6 is a mimetic view illustrating a structure of a bump foil of an ordinary thrust bearing. FIG. 7 is a cross-sectional view schematically illustrating a structure of a first exemplary turbo compressor. FIG. 8 is a mimetic view illustrating a structure of a first exemplary thrust bearing (An ordinary configuration of a thrust bearing of the present disclosure, which is the same as a configuration of a thrust bearing of the related art, is described with reference to FIG. 1).

Referring to FIG. 7, a turbo compressor may include a housing 2, an impeller 3, an impeller accommodator 4, an impeller housing 5, a motor 6 and a shaft 7 (The impeller accommodator is a partial component of the housing but supports the impeller. Accordingly, the impeller accommodator is given an additional reference numeral for convenience of description).

The housing 2 may form the turbo compressor, and the impeller 3 may be coupled to a front of the housing 2 and may compress air. The impeller accommodator 4 and the impeller housing 5 are fixed into the housing 2 and may accommodate the impeller 3. The motor 6 is installed inside the housing 2 and may rotate the shaft 7. The shaft 7 may be connected with the impeller 3 and may rotate the impeller 3.

The motor 6 may include a stator 6a and a rotor 6b. The stator 6a may be fixed into the housing 2. The rotor 6b may be installed on an outer circumferential surface of the shaft 7 that passes through a center of the stator 6a.

An air suction port 5a into which external air is suctioned may be formed at a center of a front of the impeller housing 5. An air discharge port 5b may be formed at both sides of the front of the impeller housing 5.

The impeller 3 is rotatably installed inside the impeller housing 5. Air suctioned through the air suction port by the impeller 3 is compressed by the impeller 3 and is discharged out of the air discharge port.

The shaft 7 may be rotatably supported by a thrust bearing 100 and a journal bearing 8 installed at a rear of the impeller 3. Though not illustrated, a rear end of the shaft 7 may be rotatably supported by a rear bearing.

As illustrated in FIGS. 6 to 8, the first exemplary thrust bearing 100 may be applied to a turbo compressor.

In general, an air foil-type thrust bearing includes a bump foil that entirely has the same characteristics as a spring. However, when the air foil-type thrust bearing operates actually, a thrust runner may be deformed, and, as a result, an area that serves as a bearing may differ depending on driving conditions (pressure conditions). In case an ordinary thrust bearing is applied to a turbo compressor, under high pressure ratio conditions (conditions under which an average of suction/discharge is high), a load supporting force supplied by a bearing is not sufficient. As a means to solve the problem, the thrust bearing 100 is presented.

The thrust bearing 100 may be coupled to a shaft (not illustrated) of a turbo compressor and may rotatably support front and rear impellers. The thrust bearing 100 may include a thrust runner 110 and a bump foil assembly. The thrust bearing 100 may further include a bearing housing 150 (see FIG. 18).

The thrust runner 110 has a shaft insertion portion 100a which has a cylinder shape and into which the shaft is inserted, and plate surface that extends from the shaft insertion portion 100a in a circular plate shape. The thrust runner 110 has a predetermined thickness and has a size large enough to cover the bump foil assembly. In the embodiment, a portion of the plate surface of the thrust runner 110, which is connected to the shaft insertion portion 100a, is defined as a runner central portion 112, and an outer circumferential portion, which extends radially from the runner central portion 112, is defined as a distal end 114.

When pressure is generated while the shaft is rotated at high speed by operations of the turbo compressor, pressure is applied in an axial direction of the shaft. With respect to the thrust bearing 100, a direction of a force applied to the thrust bearing 100 is a direction of the sum (Fsum) of forces. That is, as a force is applied towards the runner central portion 112, the distal end 114 is deformed in a direction farther away from the bump foil assembly.

A load applied to the distal end 114 is lower than a load applied to the runner central portion 112 connected to the shaft insertion portion 100a. Accordingly, a deformation amount of the distal end 114 is larger than a deformation amount of the runner central portion 112.

The thrust bearing is required to respond to a deformation amount and a deformed portion of the thrust runner 110. To this end, methods including a method of placing a high rigidity foil 134" at a portion where a deformation amount of the thrust runner 110 is large, a method of placing a low rigidity foil 134' at a portion where the deformation amount is small, and the like may be used (Description in relation this is provided hereunder).

The bump foil assembly is comprised of a bearing plate 132 that has a circular plate shape and has a hollow hole through which the shaft passes, a plurality of bump foils 134 that is mounted onto the bearing plate 132, and a top foil 136 that is placed between the bump foil 134 and the thrust runner 110 and that covers the bump foil 134. A configuration of the bearing plate is the same as or similar to that of a bearing plate 132 of an ordinary thrust bearing. Accordingly, detailed description in relation to this is omitted.

The bump foil assembly may be placed respectively at both sides of the thrust runner 110 with the thrust runner 110 therebetween. A bearing housing 150 that supports the thrust bearing 100 may be further mounted onto a surface opposite to a surface of the bearing plate 132, onto which the bump foil 134 is provided (For convenience of description, the bearing housing is additionally illustrated only in FIG. 18).

The bearing plate 132 may be coupled to the bump foil 134 and the top foil 136. The bump foil 134 and the top foil 136 may be supported by the bearing plate. The bump foil 134 and the top foil 135 may be welded and fixed onto one surface of the bearing plate 132. Below, a portion onto which the bump foil 134 and the top foil 136 are fixed is defined as a trailing edge, and a free end is defined as a leading edge.

The leading edge and the trailing edge may be arranged in accordance with a direction of rotation of the thrust bearing 100. The direction of rotation of the thrust bearing 100 is a direction from the leading edge towards the trailing edge.

One end of the bump foil 134 may be fixed onto the bearing plate 132, and the other end of the bump foil 134 may be a free end that is not fixed. A plurality of bump foils 134 may be provided, and each of the bump foils 134 may have various shapes. A direction in which the bump foil 134 is deformed is a direction (a Fsum direction in FIG. 8) of the sum of forces, which is the axial direction of the shaft. The bump foil 134 is a sort of plate spring. For convenience, rigidity of the bump foil 134 may be considered the same as spring constant.

In general, the bump foil 134 has a shape in which a bump crest (a convex portion) and a bump trough (a concave or flat portion) of the same shape are alternately repeated from the fixed end towards the free end. The bump foil 134 supports a load applied to the thrust bearing 100.

With respect to a cross section of the bump foil 134, a distance between the bump trough and the bump crest is defined as a bump height (H), and a distance between a starting point of the bump crest and an ending point of the bump crest is defined as a bump length (L). Additionally, a thickness of the bump foil 134 itself is defined as a bump thickness (T), and a distance between an uppermost point of the bump crest and an uppermost point of an adjacent bump crest is defined as a bump pitch (P).

The bump height (H), the bump length (L), the bump thickness (T), and the bump pitch (P) are essential factors for defining a shape of the bump foil 134. Adjustment of the bump height (H), the bump length (L), the bump thickness (T), and the bump pitch (P) results in adjustment of rigidity of the bump foil 134. In the embodiment, presented is a method by which the shape of the bump foil 134 is adjusted to adjust the rigidity (spring constant) of the bump foil 134 and the rigidity of the bump foil 134 is adjusted to respond to deformation of the thrust runner 110.

In the bump foil 134, a high rigidity foil 134" is applied to a portion where a deformation amount of the thrust runner 110 is large, and a low rigidity foil 134' is placed to a portion where the deformation amount of the thrust runner 110 is small. In this case, the portion where a deformation amount of the thrust runner 110 is relatively large is at the distal end 114 that is an outer side of the thrust runner 110 in a radial direction thereof. The portion where a deformation amount of the thrust runner 110 is relatively small is at the runner central portion 112 that is an inner side of the thrust runner 110 in the radial direction thereof.

Considering this fact, the thrust bearing 100 may be designed such that the bump foil 134 is evenly deformed. That is, considering a load supporting force differs depending on the rigidity of the bump foil 134, the thrust bearing 100 may be designed. For example, the bump foil 134 may be designed to have a relatively low spring constant at a high load area and to have a relatively high spring constant at a low load area.

In terms of the structure of the thrust bearing 100, a height of the bump foil 134 may be limited. Considering this fact, the bump foil 134 may be designed to have a spring constant between a spring constant where no plastic deformation of the bump foil 134 occurs and a spring constant where the bump foil 134 can stand a strong impact. In this case, the spring constant where no plastic deformation of the bump foil 134 occurs may correspond to 30% of the sum (Fsum) of forces applied to the thrust bearing 100, and the spring constant where the bump foil 134 can stand a strong impact may correspond to 80% of the sum (Fsum) of forces applied to the thrust bearing 100.

On the basis of the above-described design, in case the bump foil 134 is placed to correspond to a deformation amount and a deformed portion of the thrust runner 110, a thickness (A) of an oil film at the runner central portion 112 of the thrust runner 110 and a thickness (A') of an oil film at the distal end 114 may be kept identical. A structure for adjusting the rigidity of the bump foil 134 is described hereunder.

The top foil 136 is placed between the bump foil 134 and the thrust runner 110 and covers the bump foil 134. One end of the top foil 136 is fixed onto the bearing plate 132, and the other end of the top foil 136 may be formed as a free end like the other end of the bump foil 134.

The top foil 136 and the thrust runner 110 are spaced a predetermined distance apart from each other. Air as fluid may be suctioned into a space formed between the top foil 136 and the thrust runner 110, and the suctioned air may serve as an oil film. The oil film and the bump foil 134 are portions where a load applied to the thrust bearing 100 is supported. Accordingly, a thickness of an air layer, i.e., a thickness of an oil film, is important factors for a load supporting force.

In the present disclosure, presented is a structure in which a load supporting force of the thrust bearing 100 is improved with a surface area, where a thickness of an oil film remains constant, larger than that of a structure of the related art (Description in relation to this is described below).

Below, examples of the bump foil having an improved shape in response to deformation of the thrust runner is described hereunder.

FIGS. 9 to 16 are mimetic views illustrating examples of modification of a structure of the bump foil in FIG. 6.

The bump foil 134a in FIG. 9 has a semicircle shaped-bump crest. A low rigidity foil 134a' having a relatively long bump length (L) and a high rigidity foil 134a" having a relatively short bump length may be applied onto a single bump foil 134a. Referring to FIG. 7, the low rigidity foil 134a' may be placed at the runner central portion 112 where a deformation amount of the thrust runner 110 is small, and the high rigidity foil 134a" may be placed at the distal end 114 where a deformation amount of the thrust runner 110 is large. The low rigidity foil 134a' and the high rigidity foil 134a" may be continuously formed on a single bump foil 134a.

The bump foil 134b in FIG. 10 has an approximate rectangle or trapezoid shaped-bump crest. A low rigidity foil 134b' having a relatively long bump length (L) and a high rigidity foil 134b" having a relatively short bump length may be applied onto a single bump foil 134b. Referring to FIG. 7, the low rigidity foil 134b' is placed at the runner central portion 112 where a deformation amount of the thrust runner 110 is small, and the high rigidity foil 134b" may be placed at the distal end 114 where a deformation amount of the thrust runner 110 is large. The low rigidity foil 134b' and the high rigidity foil 134b" may be continuously formed on a single bump foil 134b.

The bump foil 134c in FIG. 11 has a triangle-shaped bump crest. A low rigidity foil 134c' having a relatively long bump length (L) and a high rigidity foil 134c" having a relatively short bump length may be applied onto a single bump foil 134c. Referring to FIG. 7, the low rigidity foil 134c' may be placed at the runner central portion 112 where a deformation amount of the thrust runner 110 is small, and the high rigidity foil 134c" may be placed at the distal end 114 where a deformation amount of the thrust runner 110 is large. The low rigidity foil 134c' and the high rigidity foil 134c" may be continuously formed on a single bump foil 134c.

The bump foil 134d in FIG. 12 has a bent straight line-shaped bump crest. One end of each bump crest may be formed as a free end. In this case, a low rigidity foil 134d' having a relatively long bump length (L) and a high rigidity foil 134d" having a relatively short bump length may be applied onto a single bump foil 134d. Referring to FIG. 7, the low rigidity foil 134d' may be placed at the runner central portion 112 where a deformation amount of the thrust runner 110 is small, and the high rigidity foil 134d" may be placed at the distal end 114 where a deformation amount of the thrust runner 110 is large. The low rigidity foil 134d' and the high rigidity foil 134d" may be continuously formed on a single bump foil 134d.

The bump foil 134e in FIG. 13 has a semicircle shaped-bump crest. The bump foil 134e may include a plurality of foils 134e', 134e" having the same bump length. A single bump foil 134e may be divided into a low rigidity foil 134e' and a high rigidity foil 134e". The high rigidity foil 134e" may have a shape where a bump having a height and a length shorter than those of the low rigidity foil 134e' is placed at an inner side of the high rigidity foil formed into the same shape as the low rigidity foil 134e'. Referring to FIG. 7, the low rigidity foil 134e' may be placed at the runner central portion 112 where a deformation amount of the thrust runner 110 is small, and the high rigidity foil 134e" may be placed at the distal end 114 where a deformation amount of the thrust runner 110 is large. The low rigidity foil 134e' and the high rigidity foil 134e" may be continuously formed on a single bump foil 134e.

The bump foil 134f in FIG. 14 may also have a shape where bump crests having a different shape are mixed. In the bump foil 134f, a single bump foil 134f has a semicircle shaped-bump crest and a trapezoid or rectangle-shaped bump crest. The semicircle shaped-bump crest may be formed as a low rigidity foil 134f' having a relatively long bump length, and the rectangle shaped-bump crest may be formed as a high rigidity foil 134f" having a relatively short bump length. Referring to FIG. 7, the low rigidity foil 134f' may be placed at the runner central portion 112 where a deformation amount of the thrust runner 110 is small, and the high rigidity foil 134f" may be placed at the distal end 114 where a deformation amount of the thrust runner 110 is large. The low rigidity foil 134f' and the high rigidity foil 134f" may be continuously formed on a single bump foil 134f.

As another example, a plurality of low rigidity foils and a plurality of high rigidity foils may be formed independently instead of a structure where a low rigidity foil and a high rigidity foil are placed on a single bump foil.

In the bump foil 134g in FIG. 15, a plurality of low rigidity foils 134g' and a plurality of high rigidity foils 134g" may be formed onto the bearing plate independently and individually. In this case, the low rigidity foil 134g' and the high rigidity foil 134g" may be arranged individually and regularly. For example, the plurality of low rigidity foils 134g' may be spaced a predetermined distance apart from each other and may be placed in a row, and the plurality of high rigidity foils 134g" may be spaced a predetermined distance apart from each other and may be placed in a row. In this case, the low rigidity foils 134g' and the high rigidity foils 134g" may be placed in different rows. Each of the low rigidity foils 134g' and high rigidity foils 134g" may have a cylinder shape or a semicircle shape. In size, the low rigidity foil 134g' may be relatively large and the high rigidity foil 134g" may be relatively small.

In the bump foil 134h in FIG. 16, a plurality of low rigidity foils 134h' and a plurality of high rigidity foils 134h"

may be formed onto the bearing plate independently and individually. In this case, the low rigidity foil 134h' and the high rigidity foil 134h" may be arranged individually and regularly. For example, the plurality of low rigidity foils 134h' may be spaced a predetermined distance apart from each other and may be placed in a row, and the plurality of high rigidity foils 134h" may be spaced a predetermined distance apart from each other and may be placed in a row. In this case, the low rigidity foils 134h' and the high rigidity foils 134h" may be placed in different rows. Each of the low rigidity foils 134h' and high rigidity foils 134h" may have a semioval shape or a cone shape. In size, the low rigidity foil 134h' may be relatively large and the high rigidity foil 134h" may be relatively small.

Using the above-described method by which a shape of the bump foil 134 is modified to respond to a deformation amount and a deformed portion of the thrust runner 110, a load supporting force of the thrust bearing may be increased.

Alternately, a shape of another portion not the bump foil 134 may be modified to respond to a deformation amount and a deformed portion of the thrust runner 110.

FIG. 17 is a mimetic view illustrating a structure of a second exemplary thrust bearing. FIG. 18 is a mimetic view illustrating a structure of a third exemplary thrust bearing. FIG. 19 is a mimetic view illustrating a structure of a fourth exemplary thrust bearing.

As illustrated in FIG. 17, in the second exemplary thrust bearing, the bump foils 134 may be configured to have high rigidity all together. In this case, a shape of the top foil 136 may be modified in response to a deformed portion of the thrust runner 110. That is, the top foil 136 may have a shape where a thickness is gradually increased from the runner central portion 112 towards the distal end 114.

In this case, a thickness (A') of an oil film between the runner central portion 112 and the top foil 136 generally has to be smaller than a thickness (A) of an oil film between the distal end 114 and the top foil 136. Considering this fact, in the embodiment, a thickness of the top foil 136 at a portion, where a thickness of an oil film is increased, is increased. Accordingly, a difference in thicknesses of the oil film may be maintained.

As a result, a thickness (A) of the oil film between the distal end 114 and the top foil 136 may be the same as a thickness (A') of the oil film between the runner central portion 112 and the top foil 136, and a thickness of the oil film between the distal end 114 and the top foil 136 may be maintained constantly. Thus, a surface area where the thickness of the oil film is maintained constantly may be much larger than a surface area of a structure of the related art, thereby effectively increasing a load supporting force of the thrust bearing 100.

Referring to FIG. 18, in the third exemplary thrust bearing, the bump foils 134 may be configured to have high rigidity all together. In this case, a shape of the thrust runner 110 may be modified. That is, the thrust runner 110 may have a shape where a thickness is gradually increased from the distal end 114 towards the runner central portion 112.

As a result, rigidity itself of the thrust runner 110 may be increased, and a deformation amount itself may be decreased, thereby effectively increasing a load supporting force of the thrust bearing 100.

Referring to FIG. 19, in the fourth exemplary thrust bearing, the bump foils may be configured to have high rigidity all together. In this case, shapes of the top foil 136, bearing plate 132 and bearing housing 150 may be modified. That is, a thickness at an end of the bearing housing 150 corresponding to the distal end 114 of the thrust runner 110 is increased. Accordingly, the shapes of the top foil 136 and the bearing plate 132 may be modified.

The bearing housing 150 may have a shape where a thickness is gradually decreased from the distal end 114 of the thrust runner 110 towards the runner central portion 112 in a streamlined form. The bearing plate 132 and the top foil 136 may have a streamlined portion corresponding to a streamlined portion of the bearing housing 150. Even in this case, a distance between the bearing plate 132 and the top foil 136 may be maintained constantly. That is, a height of the bump foil 134 remains the same.

In this case, a thickness (A') of an oil film at the runner central portion 112 may be larger than a thickness (A) of an oil film at the distal end 114 of the thrust runner 110 having a large deformation amount. In case the thrust runner 110 is deformed, a thickness (A) of the oil film between the distal end 114 and the top foil 136 generally has to be larger than a thickness (A') of the oil film between the runner central portion 112 and the top foil 136.

Considering this fact, in the embodiment, a shape of a portion, where a thickness of an oil film is increased, is modified, and a thickness (A) of the oil film at the runner central portion 112 is increased. Accordingly, a difference in thicknesses of the oil films, caused by deformation of the thrust runner 110, may be maintained. Thus, a surface area where a thickness of an oil film is maintained constantly may be much larger than a surface area of a structure of the related art, thereby effectively increasing a load supporting force of the thrust bearing 100.

A load-supporting surface area and pressure distribution in the thrust bearing having the above-described structure are described as follows.

FIG. 20 is a graph illustrating a thickness of an oil film and pressure distribution of exemplary thrust bearings. FIG. 21 is a graph illustrating an increased load-supporting surface area of exemplary thrust bearings.

As illustrated in FIGS. 20 and 21, the thrust runner is generally deformed towards an outer side of the thrust runner in the radial direction thereof, and a load supporting force is generally decreased. However, in case the shape of the thrust bearing is modified as in the above-described embodiments, a reduced load-supporting surface area may be much smaller than that of a thrust bearing of the related art. That is, a reduced load-supporting surface area (a size of area B) itself, caused by deformation of the thrust runner, is smaller than the surface area in FIG. 5.

Accordingly, unlike a thrust bearing of the related art, the thrust bearing has a structure that has an increased surface area where a thickness of an oil film is maintained constantly, thereby effectively improving load supporting performance of the thrust bearing.

As in the above-described embodiments, as the shape of the thrust bearing is modified, a thickness of an oil film may be maintained constantly in the radial direction of the thrust runner, thereby enabling the thrust bearing to evenly distribute and support pressure applied to the thrust bearing and ensuring improved durability of the thrust bearing.

The thrust bearing, as described above, may change the shape and rigidity of the bump foil in response to a deformed portion and deformation amount of the thrust runner by operations of the shaft of the turbo compressor, thereby preventing a reduction in load supporting forces caused by a reduced thickness of an oil film.

The thrust bearing may maintain a thickness of an oil film constantly and may produce the same effect through modification to shapes of the top foil, bearing plate, bearing housing and thrust runner themselves in response to a deformed portion and deformation amount of the thrust runner, thereby preventing a reduction in load supporting forces caused by a reduced thickness of the oil film and ensuring improved durability of the thrust bearing.

The present disclosure has been described with reference to the embodiments illustrated in the drawings. However, the disclosure is not limited to the embodiments and the drawings set forth herein. Further, various modifications may be made by one having ordinary skill in the art within the scope of the technical spirit of the disclosure. Further, though not explicitly described during description of the embodiments of the disclosure, effects and predictable effects according to the configuration of the disclosure should be included in the scope of the disclosure.

What is claimed is:

1. A thrust bearing comprising:
a thrust runner having a circular plate shape, the thrust runner being configured to be coupled to a shaft of a turbo compressor and rotatably support an impeller;
a bearing plate disposed at a surface of the thrust runner; and
a bump foil assembly disposed on the bearing plate and including (i) a plurality of bump foils mounted to the bearing plate and (ii) a top foil placed between the plurality of bump foils and the thrust runner and configured to cover the plurality of bump foils,
wherein the thrust runner is configured to at least partially deform as the shaft rotates, and
wherein at least one of the bearing plate, one or more of the plurality of bump foils, or the top foil is configured to at least partially deform based on the thrust runner deforming,
wherein the top foil has a thickness that increases in a radial direction from a first portion of the thrust runner towards a second portion of the thrust runner such that a distance between the top foil and the thrust runner is configured to, based on the thrust runner being deformed as the shaft rotates, be constant in the radial direction between the first portion and the second portion, the first portion being configured to deform less than the second portion as the shaft rotates.

2. The thrust bearing of claim 1, wherein the thrust runner is configured to, based on the shaft rotating, deform to be spaced apart from the bump foil assembly with increasing distances in a direction away from the shaft.

3. The thrust bearing of claim 1, wherein the bump foil assembly includes a first rigidity foil and a second rigidity foil having rigidity higher than the first rigidity foil,
wherein the thrust runner includes a first runner portion and a second runner portion configured to deform more than the first runner portion as the shaft rotates,
wherein the first rigidity foil is placed closer to the first runner portion than the second runner portion, and
wherein the second rigidity foil is placed closer to the second runner portion than the first runner portion.

4. The thrust bearing of claim 3, wherein the bump foil assembly includes a leading edge and a trailing edge,
wherein the trailing edge is located at one end of each of the plurality of bump foils and coupled to the bearing plate,
wherein the leading edge is located at the other end of each of the plurality of bump foils and is a free end, and
wherein a direction from the trailing edge toward the leading edge corresponds to a direction of rotation of the thrust bearing.

5. The thrust bearing of claim 3, wherein a first bump length of the first rigidity foil is longer than a second bump length of the second rigidity foil, the first bump length being a distance between starting and ending portions of a bump crest of the first rigidity foil, and the second bump length being a distance between starting and ending portions of a bump crest of the second rigidity foil.

6. The thrust bearing of claim 5, wherein each of one or more of the plurality of bump foils includes the first rigidity foil and the second rigidity foil.

7. The thrust bearing of claim 3, wherein one end of the top foil is coupled to the bearing plate, and the other end of the top foil is a free end.

8. The thrust bearing of claim 1, wherein the bump foil assembly includes a plurality of first rigidity foils and a plurality of second rigidity foils, each second rigidity foil having rigidity higher than each first rigidity foil,
wherein the thrust runner includes a first runner portion and a second runner portion configured to deform more than the first runner portion as the shaft rotates,
wherein the plurality of first rigidity foils is placed closer to the first runner portion than the second runner portion,
wherein the plurality of second rigidity foils is placed closer to the second runner portion than the first runner portion,
wherein the plurality of first rigidity foils are continuously placed,
wherein the plurality of second rigidity foils are continuously placed, and
wherein the plurality of first rigidity foils and the plurality of second rigidity foils are separate on the bearing plate.

9. A turbo compressor comprising
a shaft;
an impeller; and
a thrust bearing of claim 1.

10. The turbo compressor of claim 9, wherein the thrust runner is configured to, based on the shaft rotating, deform to be spaced apart from the bump foil assembly with increasing distances in a direction away from the shaft.

11. The turbo compressor of claim 9, wherein the bump foil assembly includes a first rigidity foil and a second rigidity foil having rigidity higher than the first rigidity foil,
wherein the thrust runner includes a first runner portion and a second runner portion configured to deform more than the first runner portion as the shaft rotates,
wherein the first rigidity foil is placed closer to the first runner portion than the second runner portion, and
wherein the second rigidity foil is placed closer to the second runner portion than the first runner portion.

12. The turbo compressor of claim 11, wherein the bump foil assembly includes a leading edge and a trailing edge,
wherein the trailing edge is located at one end of each of the plurality of bump foils and coupled to the bearing plate,
wherein the leading edge is located at the other end of each of the plurality of bump foils and is a free end, and
wherein a direction from the trailing edge toward the leading edge corresponds to a direction of rotation of the thrust bearing.

13. The turbo compressor of claim 11, wherein a first bump length of the first rigidity foil is longer than a second bump length of the second rigidity foil, the first bump length being a distance between starting and ending portions of a bump crest of the first rigidity foil, and the second bump length being a distance between starting and ending portions of a bump crest of the second rigidity foil.

14. The turbo compressor of claim 13, wherein each of one or more of the plurality of bump foils includes the first rigidity foil and the second rigidity foil.

15. The turbo compressor of claim 11, wherein one end of the top foil is coupled to the bearing plate, and the other end of the top foil is a free end.

16. The turbo compressor of claim 9, wherein the bump foil assembly includes a plurality of first rigidity foils and a plurality of second rigidity foils, each second rigidity foil having rigidity higher than each first rigidity foil,
   wherein the thrust runner includes a first runner portion and a second runner portion configured to deform more than the first runner portion as the shaft rotates,
   wherein the plurality of first rigidity foils is placed closer to the first runner portion than the second runner portion,
   wherein the plurality of second rigidity foils is placed closer to the second runner portion than the first runner portion,
   wherein the plurality of first rigidity foils are continuously placed,
   wherein the plurality of second rigidity foils are continuously placed, and
   wherein the plurality of first rigidity foils and the plurality of second rigidity foils are separate on the bearing plate.

17. A thrust bearing comprising:
   a thrust runner having a circular plate shape, the thrust runner being configured to be coupled to a shaft of a turbo compressor and rotatably support an impeller;
   a bearing plate disposed at a surface of the thrust runner; and
   a bump foil assembly disposed on the bearing plate and including (i) a plurality of bump foils mounted to the bearing plate and (ii) a top foil placed between the plurality of bump foils and the thrust runner and configured to cover the plurality of bump foils,
   wherein the thrust runner is configured to at least partially deform as the shaft rotates, and
   wherein at least one of the bearing plate, one or more of the plurality of bump foils, or the top foil is configured to at least partially deform based on the thrust runner deforming,
   wherein the thrust runner has a thickness that increases in a direction from an outer circumference of the thrust runner towards the shaft.

18. The thrust bearing of claim 17, wherein each of the bearing plate and the top foil has a shape corresponding to a shape of the bearing housing, and wherein a bearing plate is spaced apart from the top foil at a constant distance in a radial direction of the thrust runner.

19. A thrust bearing comprising:
   a thrust runner having a circular plate shape, the thrust runner being configured to be coupled to a shaft of a turbo compressor and rotatably support an impeller;
   a bearing plate disposed at a surface of the thrust runner; and
   a bump foil assembly disposed on the bearing plate and including (i) a plurality of bump foils mounted to the bearing plate and (ii) a top foil placed between the plurality of bump foils and the thrust runner and configured to cover the plurality of bump foils,
   wherein the thrust runner is configured to at least partially deform as the shaft rotates, and
   wherein at least one of the bearing plate, one or more of the plurality of bump foils, or the top foil is configured to at least partially deform based on the thrust runner deforming,
   wherein a bearing housing has a thickness that increases in a direction from a first portion of the thrust runner towards a second portion of the thrust runner, the first portion configured to deform less than the second portion as the shaft rotates.

\* \* \* \* \*